(12) United States Patent
Miura et al.

(10) Patent No.: US 6,883,762 B2
(45) Date of Patent: Apr. 26, 2005

(54) CLAMP

(75) Inventors: Hideya Miura, Toyoake (JP); Yasuaki Kawakami, Anjo (JP)

(73) Assignees: Nifco Inc., Yokohama (JP); VTEC Co., Ltd., Anjyou (JP)

(*) Notice: Subject to any disclaimer, the term of this patent is extended or adjusted under 35 U.S.C. 154(b) by 22 days.

(21) Appl. No.: 10/601,889

(22) Filed: Jun. 24, 2003

(65) Prior Publication Data

US 2004/0065785 A1 Apr. 8, 2004

(30) Foreign Application Priority Data

Oct. 8, 2002 (JP) ........................................ 2002-294965

(51) Int. Cl.⁷ .................................................. F16L 3/08
(52) U.S. Cl. ...................... 248/74.2; 248/62; 248/74.1; 248/68.1; 248/74.3
(58) Field of Search ........................... 248/62, 68.1, 71, 248/73, 65, 74.2, 74.1, 74.3; 24/555, 545, 561, 339, 484

(56) References Cited

U.S. PATENT DOCUMENTS

| | | | | |
|---|---|---|---|---|
| 3,913,187 A | * | 10/1975 | Okuda | 24/484 |
| 4,437,633 A | * | 3/1984 | Andre | 248/68.1 |
| 4,541,602 A | * | 9/1985 | Potzas | 248/544 |
| 5,184,794 A | * | 2/1993 | Saito | 248/68.1 |
| 5,230,496 A | * | 7/1993 | Shillington et al. | 248/316.5 |
| 5,460,342 A | * | 10/1995 | Dore et al. | 248/74.2 |
| 5,947,426 A | * | 9/1999 | Kraus | 248/74.2 |
| 5,954,300 A | * | 9/1999 | Sturies et al. | 248/68.1 |
| 6,241,198 B1 | * | 6/2001 | Maruyama | 248/49 |
| 6,371,419 B1 | * | 4/2002 | Ohnuki | 248/74.2 |
| 6,565,049 B1 | * | 5/2003 | Hahn | 248/68.1 |
| 6,585,196 B1 | * | 7/2003 | Nakanishi | 248/68.1 |

FOREIGN PATENT DOCUMENTS

| | | |
|---|---|---|
| DE | 197 52 525 | 8/1998 |
| JP | 2517108 | 8/1996 |

* cited by examiner

*Primary Examiner*—Kimberly Wood
(74) *Attorney, Agent, or Firm*—Manabu Kanesaka

(57) ABSTRACT

A clamp includes a fitting portion to be fixed to an object to be attached; a clamp portion having a substantially U-character shape connected to the fitting portion; a first receiving portion for receiving a rod-shaped member through an insertion port; and a second receiving portion for receiving a rod-shaped member through an insertion port of the clamp portion and passing through the first receiving portion. An elastic piece extends from an inner wall of the clamp portion to hold the first rod-shaped member together with the first receiving portion. A stopper extends from the inner wall of the clamp portion to hold the second rod-shaped member together with the second receiving portion and to prevent the first rod-shaped member from entering the second receiving portion.

8 Claims, 7 Drawing Sheets

CLAMP

BACKGROUND OF THE INVENTION AND RELATED ART STATEMENT

The invention relates to a clamp for attaching a pipe and the like of an air conditioner in an automobile to an object to be attached such as a body panel.

Conventionally, a pipe of an air conditioner and the like is attached to a predetermined position of a body panel in an automobile through a clamp. For example, as shown in FIG. 6, Japanese Patent Publication (KOKAI) No. 2000-205211 has disclosed a clamp that includes a fitting portion 100 to be fitted to a stud bolt projecting from a body panel of an automobile and a clamp portion 106 for holding pipes 102, 104.

Circular arc shape holders 108, 110 corresponding to outer diameters of the pipes 102, 104 are formed on the clamp portion 106. Supporting walls 112, 114 are provided to the respective holders 108, 110. Elastically deformable guiding pieces 116, 118, which bend toward central portions of the respective holders 108, 110, extend from forward end surfaces of the respective supporting walls 112, 114.

Guiding walls 120, 122 are formed to face the supporting walls 112, 114. A space between the guiding wall 120 and the guiding piece 116, or a space between the guiding wall 122 and the guiding piece 118, has a diameter smaller than that of the pipe 102, or 104. Therefore, when the pipes 102, 104 are inserted in the space between the guiding piece 116 and the guiding wall 120 and the space between the guiding piece 118 and the guiding wall 122, the guiding pieces 116, 118 are elastically deformed to thereby allow the pipes 102, 104 to pass therethrough.

The maximum space between the guiding piece 116 and the holder 108 and the maximum space between the guiding piece 118 and the holder 110 are substantially the same as the diameters of the pipe 102, 104, respectively. The guiding pieces 116, 118 restore when the pipes 102, 104 contact the holders 108, 110, so that the end portions of the guiding pieces 116, 118 press the pipes 102, 104.

In other words, in the conventional clamp, the pipe 102 is held in the holder 108, and the pipe 104 is held in the holder 110, i.e. two pipes 102, 104 are situated in parallel.

When four pipes are mounted to the clamp portion, in order to reduce an area for mounting the clamp portion as little as possible, it is better that two pipes are mounted on each holder. However, when the guiding wall and the guiding piece hold two pipes, a pipe at an inner side of the clamp portion is held with a folding force different from that of the pipe at an entrance side.

When two pipes have slightly different diameters, a pipe with a smaller outer diameter is held with a force smaller than that of a pipe with a larger diameter. Therefore, there is a risk that the pipe is not sufficiently supported in a state that the clamp is fixed to a body panel.

To solve this problem, as shown in FIG. 7, a modified clamp has two clamp portions 124 affixed back to back. Holders 108, 110, guiding walls 120, 122 and guiding pieces 116, 118 are provided in two rows in a vertical direction. Pipes 102 and 104 are inserted from above and below so that each of the holders 108, 110 holds each of the pipes 102, 104. Accordingly, four pipes 102, 104 are held in two rows, i.e. in the vertical and horizontal directions. As a result, the upper and lower holders 108, 110 hold the pipes 102, 104 with the same force, thereby securely holding the pipes 102, 104.

The upper and lower clamp portions 124 hold the pipes 102, 104 in a state that a fitting portion 100 is fitted into the stud bolt projecting from the body panel. Therefore, it is necessary to insert the pipes 102, 104 from the upper and lower directions, resulting in poor workability.

In view of the above defects, the present invention has been made, and an object of the invention is to provide a clamp for securely holding a plurality of pipes with improved workability.

Further objects and advantages of the invention will be apparent from the following description of the invention.

SUMMARY OF THE INVENTION

In order to attain the above objects, according to the first aspect of the invention, a clamp includes a fitting portion to be fixed to an object to be attached; a clamp portion having a substantially U-character shape connected to the fitting portion; a first receiving portion for receiving a first rod-shaped member inserted through an insertion port disposed at a central portion of the clamp portion; a second receiving portion disposed in an inner side of the clamp portion for receiving a second rod-shaped member inserted through the insertion port of the clamp portion and passed through the first receiving portion; an elastic piece extending from an inner wall of the clamp portion toward a central portion of the first receiving portion and elastically deforming to hold the first rod-shaped member together with the first receiving portion; and a stopper extending from the inner wall of the clamp portion toward the central portion of the second receiving portion and elastically deforming to hold the second rod-shaped member together with the second receiving portion and to prevent the first rod-shaped member from entering the second receiving portion.

In the first aspect of the invention, the first rod-shaped member and the second rod-shaped member are inserted through the insertion port of the clamp portion. In other words, the first rod-shaped member and the second rod-shaped member are inserted through the same insertion port. Therefore, the first rod-shaped member and the second-rod shape member are inserted into the clamp portion in the same insertion direction. The pipes are mounted to the clamp portion with excellent workability, thereby reducing assembly work. Also, since the first rod-shaped member and the second rod-shaped member are situated in two levels, an installation area of the clamp portion is reduced.

In the first aspect of the invention, the first receiving portion and the elastic piece hold the first rod-shaped member, and the second receiving portion and the stopper hold the second rod-shaped member. The stopper prevents the first rod-shaped member from entering the second receiving portion. Therefore, when the second rod-shaped member has a diameter smaller than that of the first rod-shaped member and the first rod-shaped member is disposed on the upper side of the second rod-shaped member in the state that the clamp is fixed to the object to be attached, even if the first rod-shaped member tries to enter the second receiving portion through the first receiving portion, since the stopper prevents the first rod-shaped member from entering the second receiving portion, there is no risk that the first rod-shaped member falls down to the second receiving portion.

According to the second aspect of the invention, the stopper is arranged on a falling track of the first rod-shaped member in a state that the fitting portion is fixed to an object to be attached so that the first rod-shaped member is prevented from entering the second receiving portion.

According to the third aspect of the invention, the stopper includes a base portion and a holding piece. The base portion extends from an inner wall of the clamp portion at a right angle. The holding piece extends to both sides with a forward end of the base portion as a center, and has one end extending toward the center portion of the second receiving portion and the other end extending toward the first receiving portion. The holding piece has a thickness larger than that of the base portion.

In the third aspect of the invention, the holding piece has a thickness larger than that of the base portion, so that the stopper can elastically deform easily and, at the same time, the second rod-shaped member can be easily received.

According to the fourth aspect of the invention, only a single stopper projects from the inner wall of the clamp portion. Even if the stopper is formed of the single plate, it is possible to hold the second rod-shaped member together with the second receiving portion, and to prevent the first rod-shaped member from entering the second receiving portion in the state that the fitting portion is fixed to an object to be fixed.

DETAILED DESCRIPTION OF PREFERRED EMBODIMENTS

Figure 1:
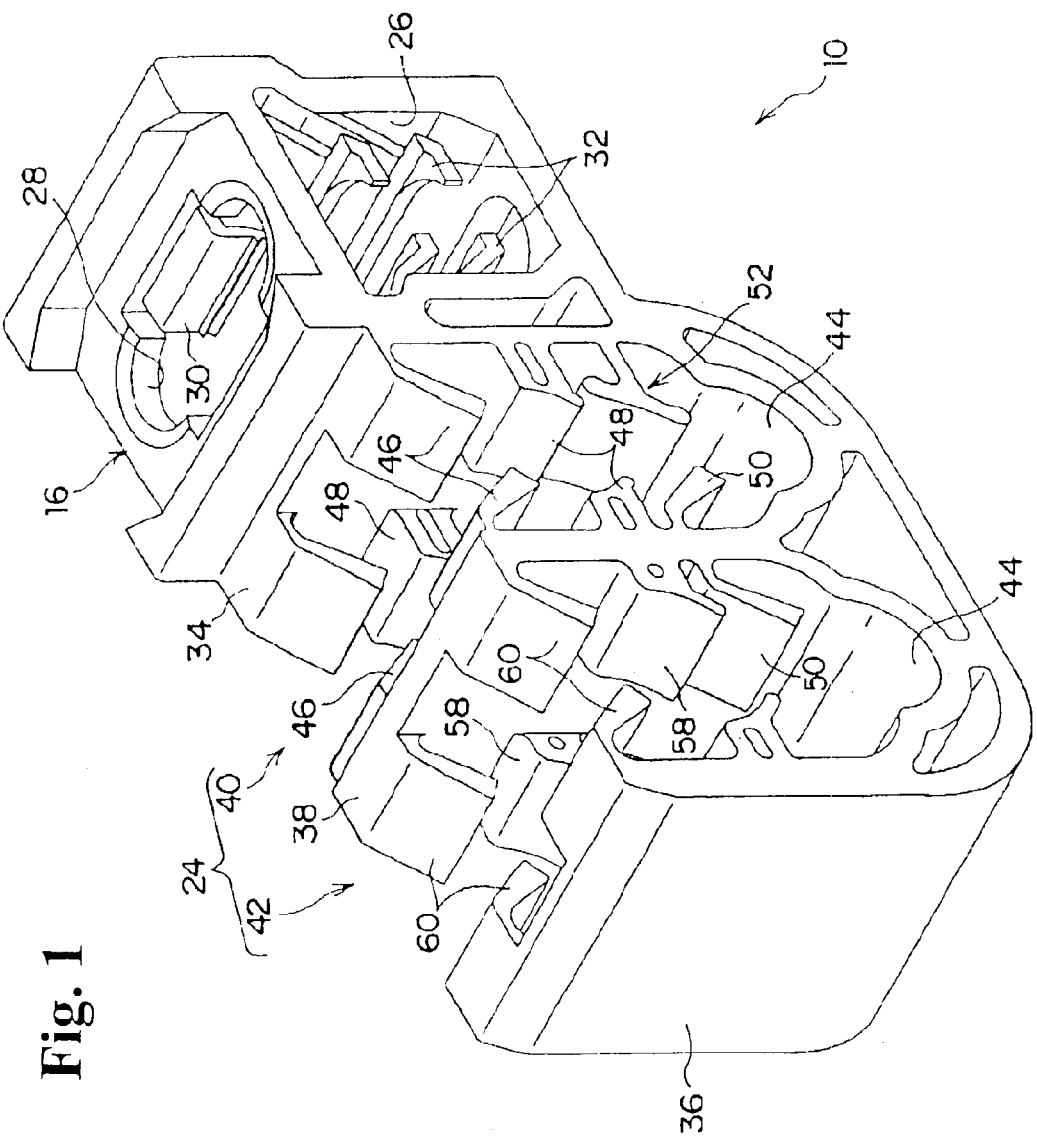
FIG. 1 is a perspective view showing a clamp according to the present invention.

Hereunder, embodiments of the present invention will be explained with reference to the accompanying drawings. FIGS. 1 through 5 show a clamp 10 according to the present invention. The clamp 10 is formed of a fitting portion 16 to be fitted to a stud bolt 14 projecting from a body panel 12 of an automobile and a clamping portion 24 for holding pipes 18, 20, and 22 of an air conditioner as rod-shaped members.

The fitting portion 16 has a box shape with openings 26 on sidewalls. A hole 28 for inserting the stud bolt 14 projecting from the body panel 12 is provided on an upper portion of the fitting portion 16. A pair of guiding pieces 30 projects inwardly toward a lower side from the hole 28 for guiding the stud bolt 14 to a pair of stopping pieces 32.

The stopping pieces 32 are disposed at two positions on each of both inner walls 16A of the fitting portion 16 in the vertical direction, and forward ends thereof have horizontal surfaces. A space between the two stopping pieces 32 in the vertical direction is equal to a pitch of the thread of the stud bolt 14. Forward end portions 32A of the stopping pieces 32 enter the screw groove of the inserted stud bolt 14 to prevent the clamp 10 from pulling out from the stud bolt 14 easily.

The clamp portion 24 has a substantially U-shape, and a partition wall 38 is provided at the central portion of the clamp portion 24 along the sidewalls 34, 36 in the width direction. The clamp portion 24 is divided into a holding portion 40 and a holding portion 42 by the partition wall 38.

The holding portions 40, 42 deform elastically. The sidewall 34 and the partition wall 38 can move closer to and away from each other, and the sidewall 36 and the partition wall 38 can move in the same way. Therefore, when the holding portion 40 or the holding portion 42 is bent outward to widen a space between the sidewall 34 and the partition wall 38 or the sidewall 36 and the partition wall 38, the pipes 18, 20 can enter the holding portion 40, or the pipes 18, 22 can enter the holding portion 42.

Hereunder, the holding portion 40 will be explained. The holding portion 40 has a receiving portion 44 (second receiving portion) at a bottom thereof. The receiving portion 44 has a circular arc shape having a curvature substantially the same as an outer curvature of the pipe 18 to make a surface contact with the pipe 18. A pair of elastic pieces 46 extends from an upper end of the sidewall 34 and the partition wall 38 of the holding portion 40 (along a width direction of the central wall 38), and bends toward the central portion of the receiving portion 44.

The elastic pieces 46 deform elastically toward the sidewall 34 and the partition wall 38, respectively, and a space between upper surfaces 46A of the elastic pieces 46 is narrower than the outer dimensions of the pipes 18 and 20. A forward end surface of each elastic piece 46 is formed in a circular arc surface 46B having a curvature radius substantially the same as the outer dimension of the pipe 20 to make a surface contact with the pipe 20.

Further, a pair of receiving portions 48 (first receiving portion) is provided at central portions of the sidewall 34 and the partition wall 38, and extends in the width direction of the partition wall 38 at a right angle with respect to the sidewall 34 or the partition wall 38. Forward end surfaces of the receiving portions 48 face the circular arc surfaces 46B of the elastic pieces 46, and have circular arc surfaces 48A having a curvature radius substantially the same as the outer dimension of the pipe 20 to make a surface contact with the pipe 20.

An elastic piece 50 is formed just below the receiving portion 48 at the partition wall 38, and extends toward the receiving portion 44. The elastic piece 50 deform elastically toward the partition wall 38, and a forward end surface of the elastic piece 50 has a circular arc surface 50B having a curvature radius substantially the same as the outer dimension of the pipe 18 to make a surface contact with the pipe 18.

A pair of stoppers 52 is provided on the sidewall 34 at a position facing the elastic piece 50 along the width direction of the central wall 38, and has a substantially T-shape. The stopper 52 is formed of a base portion 54 and a holding piece 56. The base portion 54 extends from the sidewall 34 at a right angle, and has a forward end provided with the holding piece 56.

The holding piece 56 extends to both sides of the base portion 54 as a center, in which one end thereof is directed toward the receiving portion 48 and the other end thereof is directed toward the central portion of the receiving portion 44. The holding piece 56 has a thickness larger than that of the base portion 54. An upper surface of the holding piece 56 substantially faces the elastic piece 46 and has an arc surface 52A with a gentle circular shape.

Figure 4:
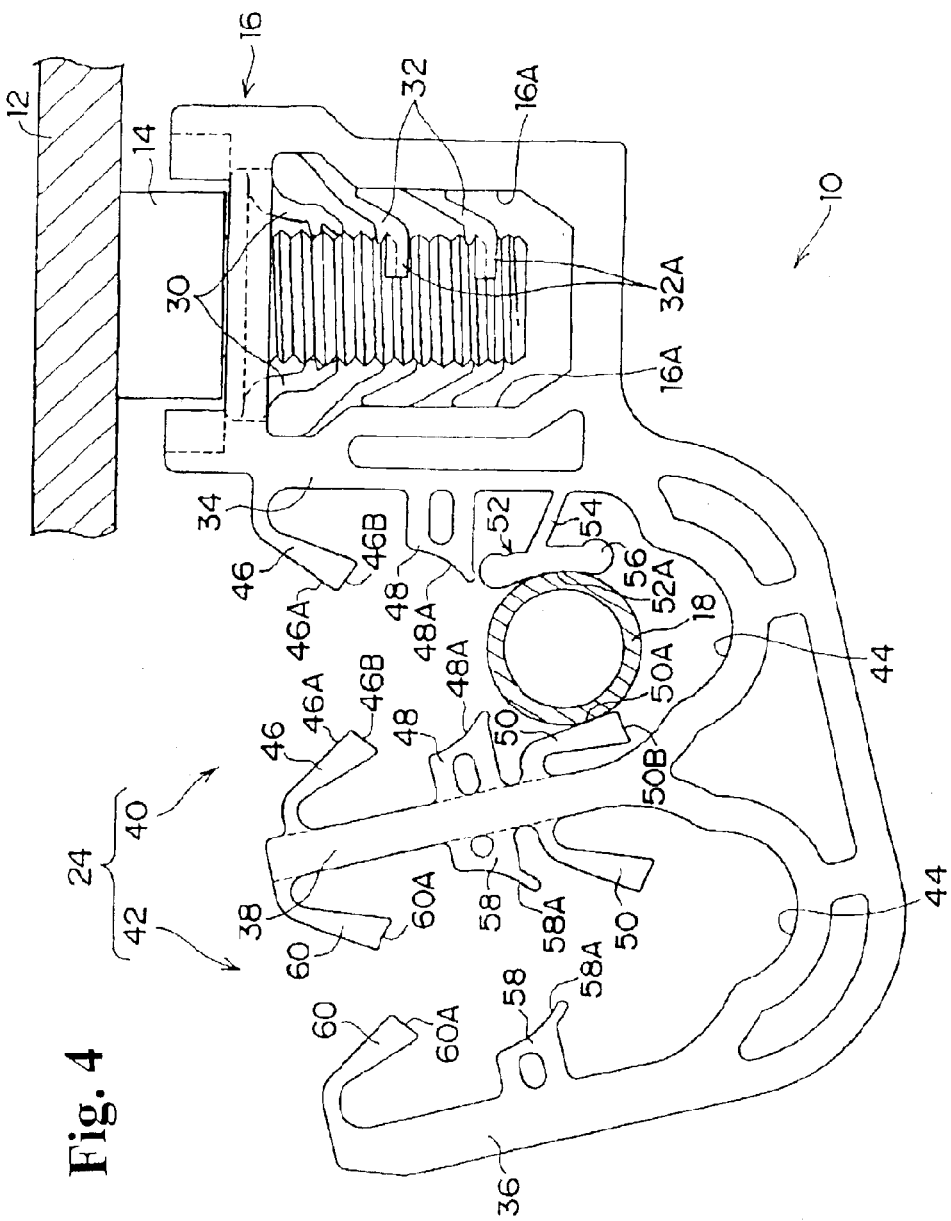
FIG. 4 is a front view showing the clamp with the pipe further inserted therein.
Figure 5:
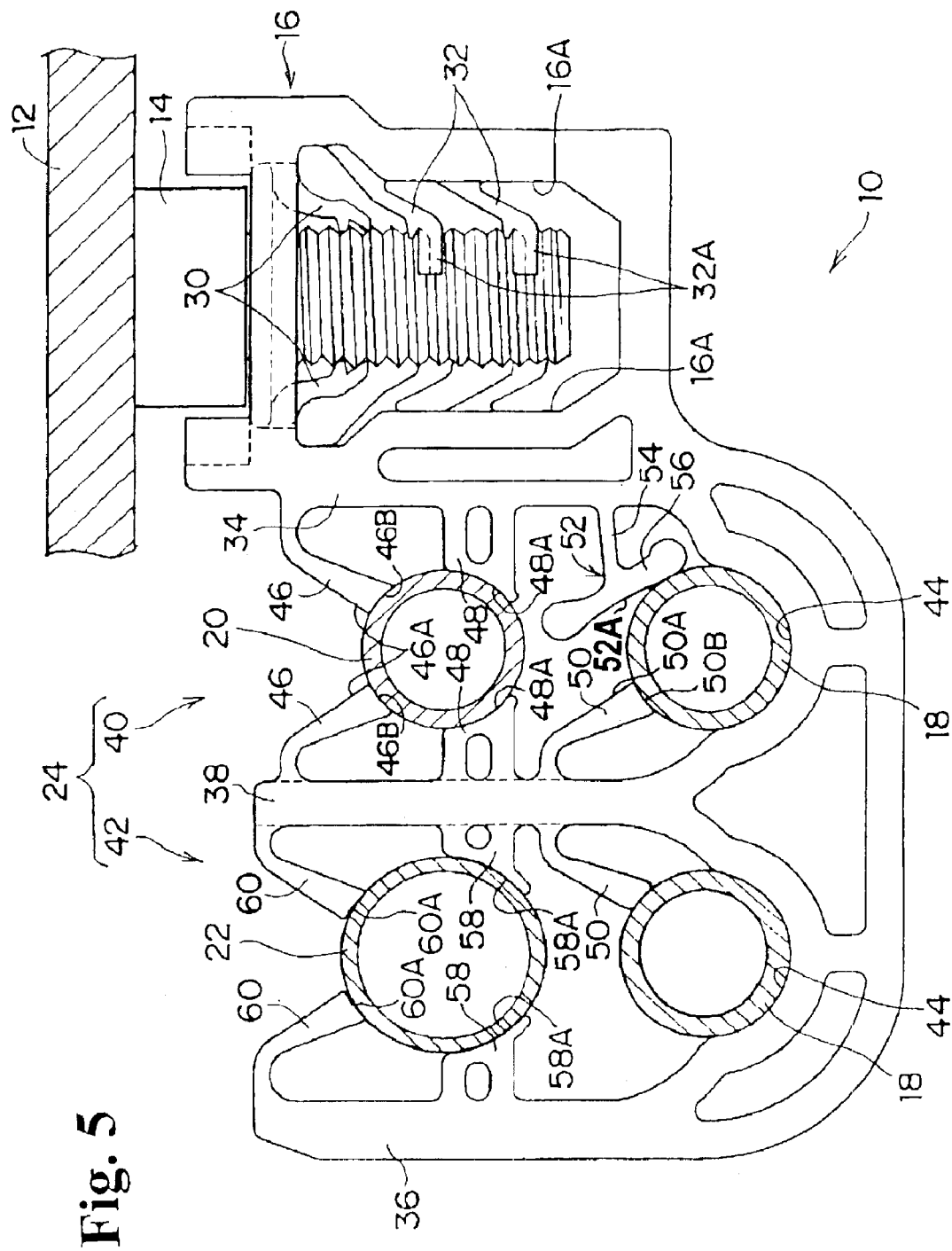
FIG. 5 is a front view showing the clamp with four pipes inserted therein.
Figure 6:
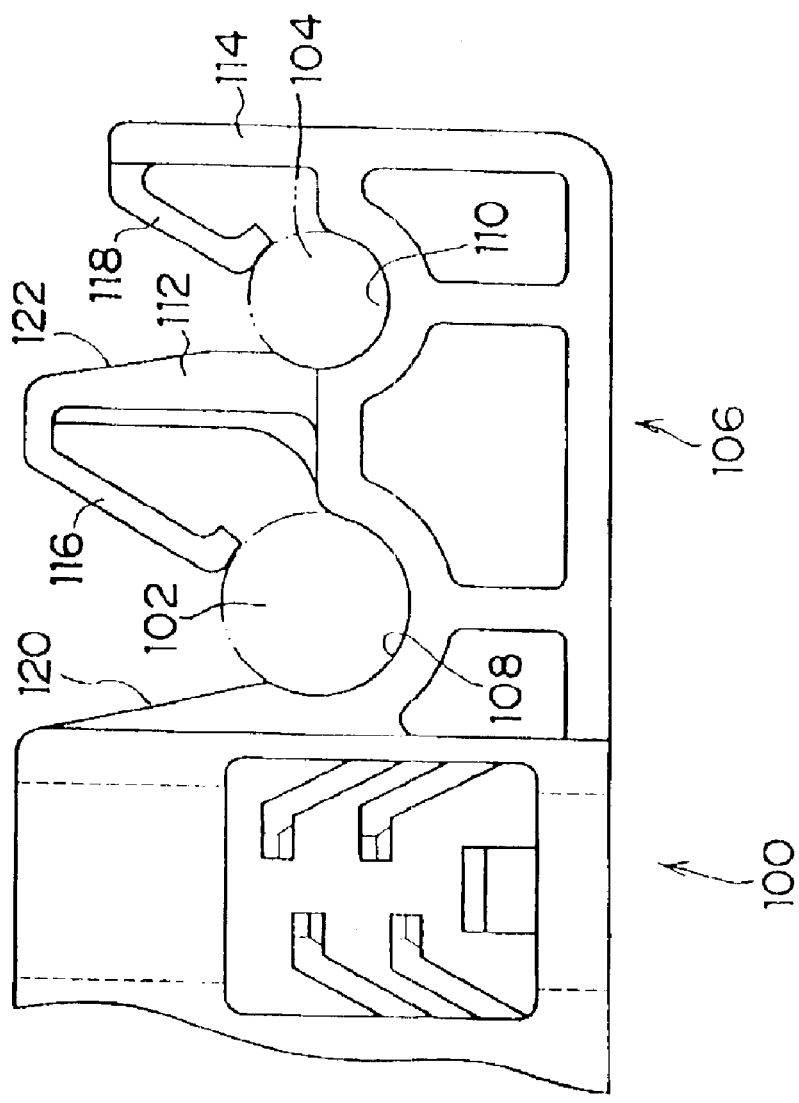
FIG. 6 is a front view showing a conventional clamp.
Figure 7:
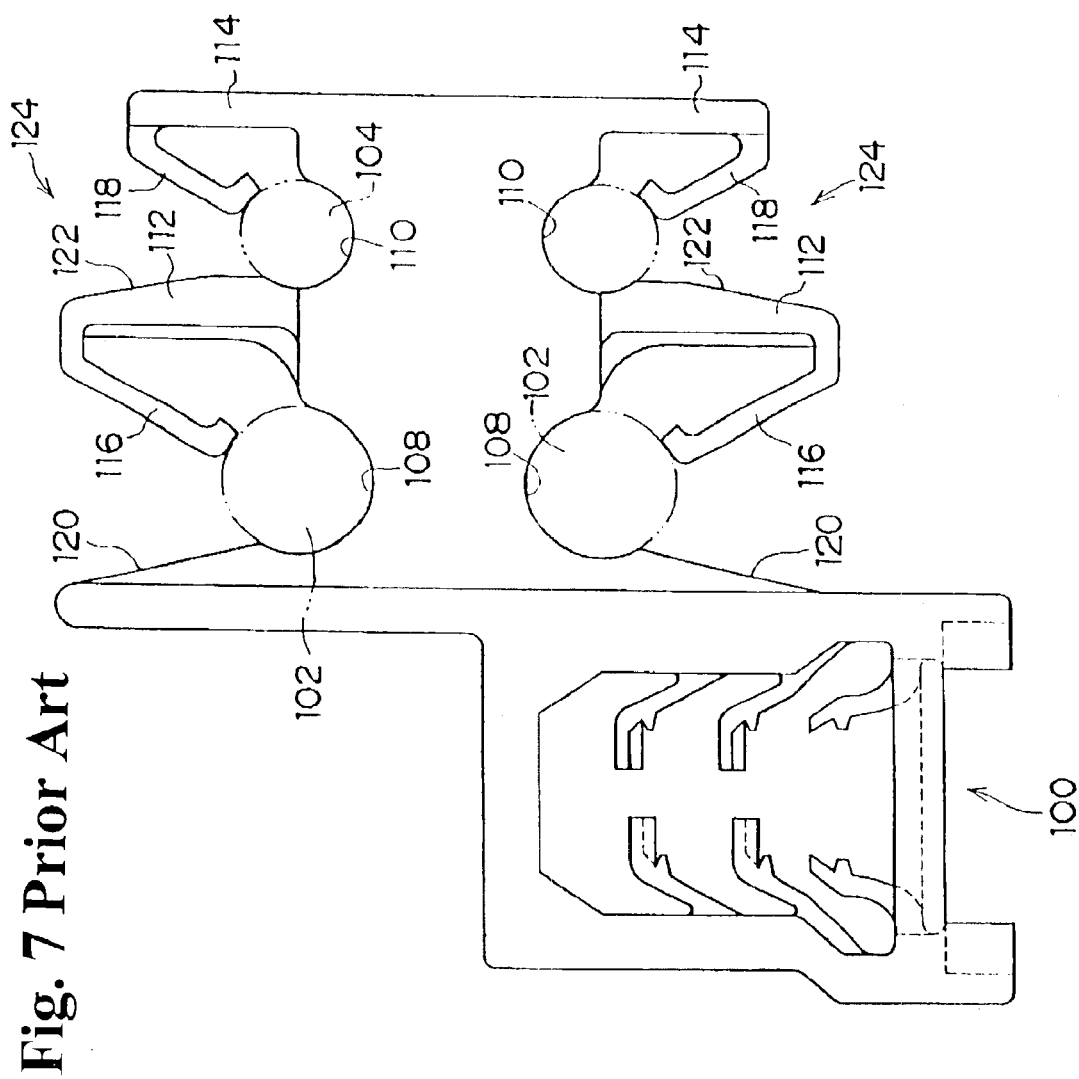
FIG. 7 is a front view showing another conventional clamp.

The stopper 52 is rotatable around the base portion 54. As shown in FIGS. 4 and 5, when the pipe 18 passes through, the circular arc surface 52A of the holding piece 56 rotates while making a surface contact with the pipe 18, so that the circular arc surface 52A of the holding piece 56 substantially faces the receiving portion 44.

Figure 2:
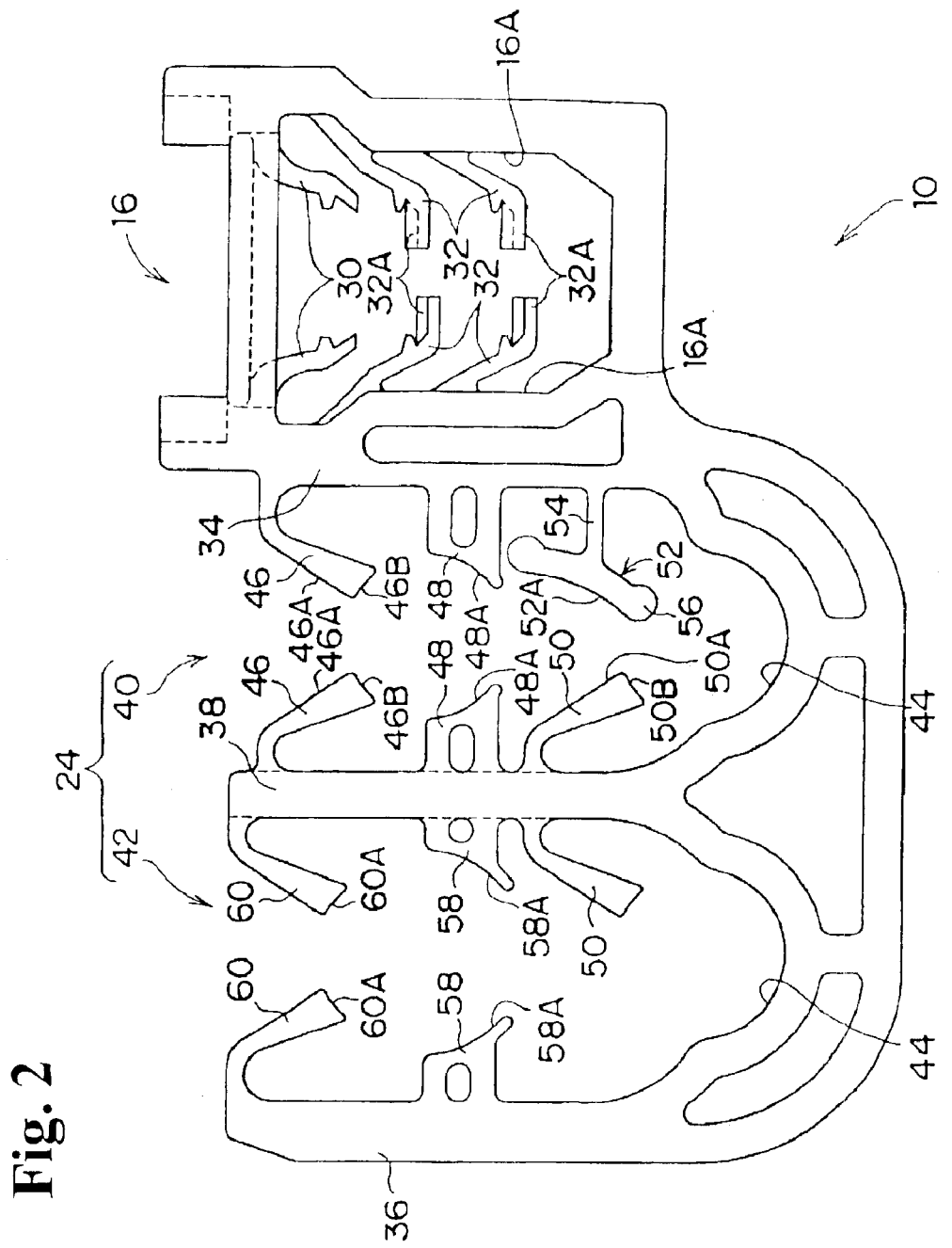
FIG. 2 is a front view showing the clamp.

Next, the holding portion 42 will be explained. As shown in FIGS. 2 and 5, the holding portion 42 has substantially the same structure as that of the holding portion 40. Therefore, explanations of the same portions are omitted.

The holding portion 42 does not include the stopper 52. In receiving portions 58 corresponding to the receiving portions 48 of the holding portion 40, a distance between circular arc surfaces 58A formed at forward end surfaces of the receiving portion 58 is larger than that between the forward end surfaces 48A of the receiving portions 48.

The circular arc surface 58A of the receiving portion 58 has a curvature radius larger than that of the circular arc surface 48A of the receiving portion 48, so that a pipe 22 having a diameter larger than that of the pipe 18 can be received therein.

A pair of elastic pieces 60 is provided on inner walls of the sidewall 36 and the partition wall 38, and extends from the forward end surfaces of the sidewall 36 and the partition wall 38, respectively. A distance between a circular arc surface 60A provided at a forward end surface of the elastic piece 60 and a circular arc surface 58A of the receiving portion 58 is larger than that between the circular arc surface 46B of the elastic piece 46 and the circular arc surface 48A of the receiving portion 48. Therefore, the pipe 22 can be held between the circular arc surface 60A of the elastic piece 60 and the circular arc surface 58A of the receiving portion 58.

Figure 3:
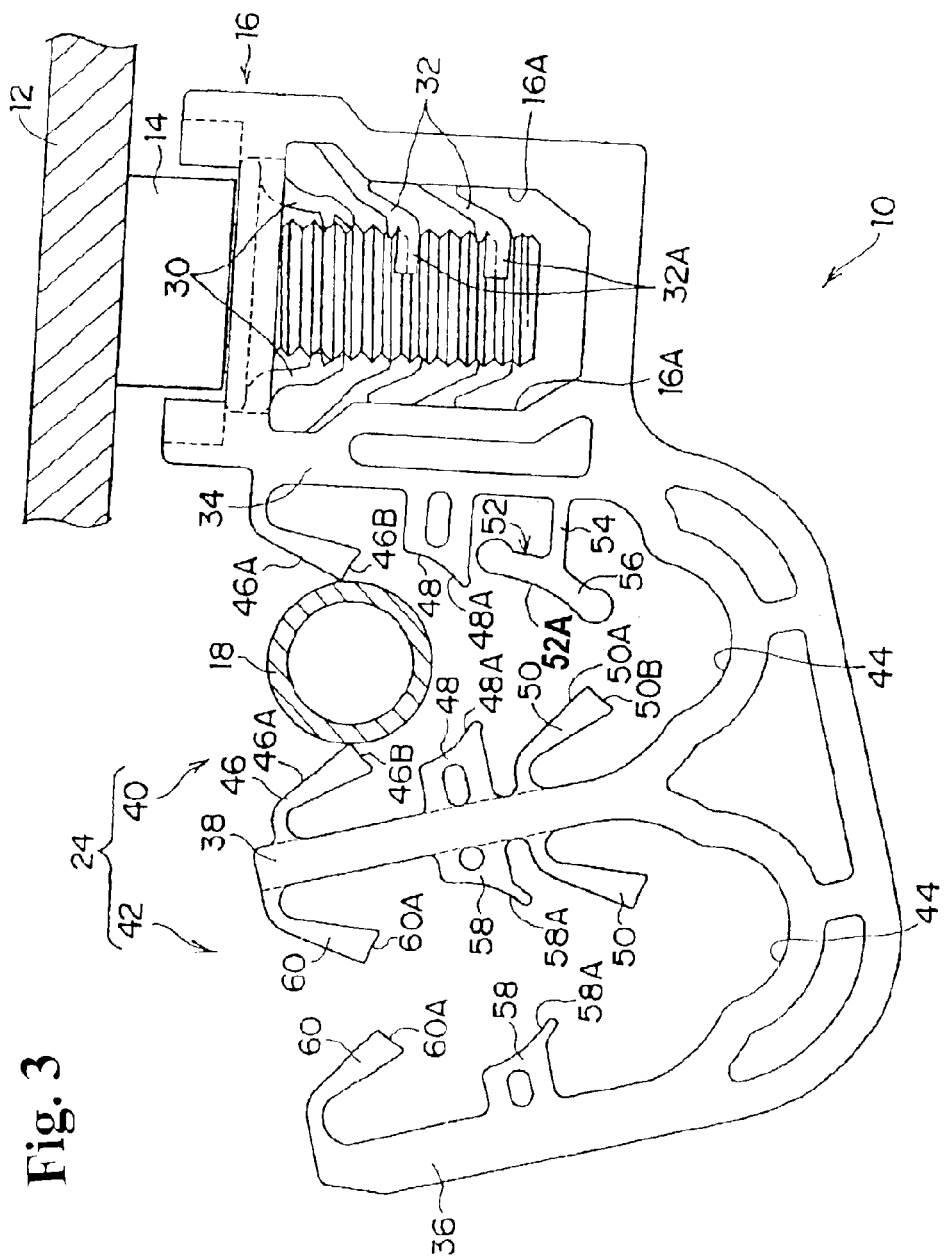
FIG. 3 is a front view showing the clamp with a pipe inserted therein.

Next, a method of mounting the pipes to the clamp according to the present embodiment will be explained. First, as shown in FIGS. 3 through 5, the fitting portion 16 of the clamp 10 is fitted to the stud bolt 14 provided to the body panel 12, and the clamp 10 is fixed to the body panel 12. Then, the pipes 18, 20, 22 are mounted to the clamp portion 24.

When the pipe 18 is inserted into the holding portion 40 through an insertion opening thereof, the pipe 18 abuts against the upper surfaces 46A of the elastic pieces 46. In this state, when the pipe 18 is pushed into the holding portion 40, the elastic pieces 46 elastically deform toward the partition wall 38, and the holding portion 40 elastically deforms through the elastic piece 46, so that the space between the sidewall 34 and the partition wall 38 is widened.

The pipe 18 is moved into the holding portion 40 along the upper surfaces 46A of the elastic pieces 46. Then, when the pipe 18 passes through the forward end angular portions of the elastic pieces 46, the elastic pieces 46 and the holding portion 40 are restored, and the pipe 18 is once received by the circular arc surfaces 46B of the elastic pieces 46 and the circular arc surfaces 48A of the receiving portions 48.

From this state, when the pipe 18 is further pushed into the holding portion 40, the holding portion 40 elastically deforms through the receiving portions 48, and the space between the sidewall 34 and the partition wall 38 is widened according to the movement of the pipe. Thus, the space between the receiving portions 48 is widened to thereby allow the pipe 18 to pass therethrough.

Then, as shown in FIG. 4, the pipe 18 abuts against the upper surface 50A of the elastic piece 50 and the circular arc surface 52A of the stopper 52. From this state, when the pipe 18 is further pushed into the holding portion 40, the elastic piece 50 elastically deforms toward the partition wall 38. At the same time, the stopper 52 rotates around the base portion 54 according to the movement of the pipe 18, so that the circular arc surface 52A of the stopper 52 substantially facing the elastic piece 46 substantially faces the receiving portion 44.

When the pipe 18 is further moved inward to pass through the upper surface 50A of the elastic piece 50 and the forward end angular portion thereof, as shown in FIG. 5, the elastic piece 50 and the holding portion 40 restore. Therefore, the pipe 18 makes a surface contact with the circular arc surface 44A of the receiving portion 44 and the circular arc surface 50B of the elastic piece 50. Accordingly, the pipe 18 is held by the circular arc surface 44A of the receiving portion 44, the upper surface 50A of the elastic piece 50, and the circular arc surface 52A of the stopper 52.

After the pipe 18 is mounted on the inner side of the holding portion 40, the pipe 20 is mounted on the entrance side of the holding portion 40. The pipe 20 is pushed to the inner part of the holding portion 40 in a state that the pipe 20 abuts against the upper surfaces 46A of the elastic pieces 46 of the holding portion 40.

The elastic pieces 46 elastically deform, and the holding portion 40 elastically deforms through the elastic pieces 46 to thereby move the pipe 20 in the holding portion 40. When the pipe 20 is moved along the upper surfaces 46A of the elastic pieces 46 to pass through the forward end angular portions of the elastic pieces 46, the elastic pieces 46 and the holding portion 40 restore. Accordingly, the pipe 20 is held by the circular arc surfaces 46B of the elastic pieces 46 and the circular arc surfaces 48A of the receiving portions 48.

As described above, the pipes 18, 20 are mounted in the holding portion 40. Next, the pipes 18 and 22 are mounted in the holding portion 42. Since the pipes 18 and 22 are mounted in the same way as that for the pipes 18, 20 mounted in the holding portion 40, the explanation thereof is omitted.

Next, an operation of the clamp according to the invention will be explained. As shown in FIGS. 3 through 5, according to the present invention, it is possible to mount the pipes 18, 20 (or 18, 22) to the holding portion 40 (or 42) through the same insertion opening.

That is, the pipes 18, 20 are inserted into the holding portion 40 in the same direction, resulting in good workability and reducing assembly work. Also, the pipes 18, 20 (or 18, 22) can be situated in two levels inside the holding portions 40 (or 42), thereby reducing a space for installing the clamp portion 24.

The base portion 54 has a thickness less than that of the holding piece 56, so that the stopper 52 easily rotates to receive the pipe 18.

As shown in FIG. 5, one end of the holding piece 56 of the stopper 52 is positioned under the pipe 20. The pipe 20 with a smaller diameter is situated above the pipe 18 in the state that the clamp 10 is fixed to the body panel 12. One end portion of the holding piece 56 of the stopper 52 is disposed under the pipe 20. Thus, the pipe 20 is restrained by the holding piece 56 of the stopper 52, before the pipe 20 falls down through the space between the receiving portions 48 due to vibration of the car or the like. The pipe 20 is prevented from moving down to the receiving portion 44, so that the pipe 20 does not fall down to the holding portion 40.

On the other hand, in the holding portion 42, the pipe 22 having a larger diameter than that of the pipe 18 is mounted in an upper part of the holding portion 42. Accordingly, if the pipe 22 passes through the space between the receiving portions 58, the space between the sidewall 36 and the central wall 38 must be widened larger than that of the case where the pipe 18 is inserted. Therefore, there is no risk that the pipe 20 with a smaller diameter mounted at the upper side falls down on the receiving portion 44 as in the case of the holding portion 40.

In the holding portion 42, while the stopper 52 is not required, depending on the outer dimension and an arrangement of the pipe 22, the stopper 52 may be added to the holding portion 42.

In the present embodiment, the stopper 52 is provided only on the sidewall 34 of the holding portion 40. Alternatively, another stopper may be provided instead of the elastic piece 50. Also, the elastic piece 50 is not always required, and the receiving portion 44 and the stoppers 52 may hold the pipe 18.

Further, in the present embodiment, each holding portion holds two pipes, but it is not limited thereto. Each holding portion may hold three pipes. In this case, the stoppers are provided at positions constituting a middle step and a lower step of the holding portion in the state that the clamp is fixed to the body panel.

In the present embodiment, the elastic pieces 46, 60, the receiving portions 48, 58 and the stoppers 52 are provided in a pair along the width direction of the central wall 38, respectively. The elastic pieces 46, 60, the receiving portions 48, 58 and the stoppers 52 are formed in a non-continuous shape to easily deform elastically. So long as the pipes 18, 20 and 22 can be inserted, it is not necessary to form in the non-continuous shape along the width direction of the central wall 38.

According to the present invention, with the structure as described above, the first rod-shaped member and the second rod-shaped member are inserted into the clamp portion in the same direction, so that the workability is excellent and the assembly work is reduced. Also, the first rod-shaped member and the second rod-shaped member are situated in two levels. Therefore, the installation area of the clamp portion can be reduced. Further, the second rod-shaped member is held by the stopper, and the first rod-shaped member is prevented from entering into the second receiving portion. Therefore, the first rod-shaped member does not fall down to the second receiving portion in the state that the clamp is fixed to an object to be attached.

While the invention has been explained with reference to the specific embodiments of the invention, the explanation is illustrative and the invention is limited only by the appended claims.

What is claimed is:

1. A clamp for holding a plurality of rod-shaped members, comprising:
   a fitting portion to be fixed to an object to be attached;
   a first clamp portion having a substantially U-shape and attached to the fitting portion, said first clamp portion having an inner wall and an opening;
   a first receiving portion disposed inside the first clamp portion at a middle thereof in a depth direction for receiving one rod-shaped member through the opening of the first clamp portion;
   a second receiving portion disposed inside the first clamp portion at a bottom thereof for receiving another rod-shaped member through the opening of the clamp portion and the first receiving portion;
   a first elastic piece extending from the inner wall of the first clamp portion toward a center of the first receiving portion, said first elastic piece being elastically deformable for allowing the one rod-shaped member to pass therethrough and holding the one rod-shaped member in a space between the first elastic piece and the first receiving portion; and
   a stopper extending from the inner wall of the first clamp portion toward a center of the second receiving portion, said stopper being elastically deformable for allowing the another rod-shaped member to enter the second receiving portion to hold the another rod-shaped member in a space between the stopper and the second receiving portion, said stopper including a base portion extending from the inner wall of the first clamp portion at a substantially right angle, and a holding piece formed at an end of the base portion to extend generally vertically to the base portion, said holding piece having one end extending toward the second receiving portion and the other end extending toward the first receiving portion, said holding piece being rotatably attached to the base portion so that when the another rod-shape member is retained in the second receiving portion, the other end is directed to a center area of the first receiving portion to prevent the one rod-shaped member from entering the second receiving portion.

2. A clamp as claimed in claim 1, wherein said stopper is situated under the first receiving portion.

3. A clamp as claimed in claim 1, wherein said holding piece has a thickness larger than that of the base portion.

4. A clamp as claimed in claim 1, further comprising a second elastic piece extending from a wall opposite to the inner wall of the first clamp portion toward the center of the first receiving portion and facing the first elastic piece for holding the one rod-shaped member in a space defined by the first elastic piece, the second elastic piece and the first receiving portion, said second elastic piece being elastically deformable for allowing the another rod-shaped member to pass therethrough.

5. A clamp as claimed in claim 4, further comprising a third elastic piece extending from a wall opposite to the inner wall of the first clamp portion toward the center of the second receiving portion and facing the stopper for holding the another rod-shaped member in a space defined by the stopper, the third elastic piece and the second receiving portion, said third elastic piece being elastically deformable for allowing the another rod-shaped member to pass therethrough.

6. A clamp as claimed in claim 1, wherein said first clamp portion has an elasticity so that the opening of the first clamp portion expands outwardly to allow the one and another rod shaped members to enter into the first and second receiving portions.

7. A clamp as claimed in claim 1, further comprising a second clamp portion integrally formed with and located adjacent to the first clamp portion, said second clamp portion including a third receiving portion disposed at a middle thereof for receiving a further rod-shaped member, a fourth receiving portion disposed at a bottom thereof for receiving a still further rod-shaped member through the third receiving portion, a second elastic piece extending from an inner wall of the second clamp portion toward a center of the third receiving portion, and a third elastic piece extending from the inner wall of the second clamp portion toward a center of the fourth receiving portion.

8. A clamp as claimed in claim 1, wherein said holding piece is arranged to the base portion so that an inner surface of the holding piece orients slightly upwardly.

* * * * *